United States Patent Office 2,969,362
Patented Jan. 24, 1961

2,969,362
2-[α-(HALOALKYL)BENZYLTHIO]IMIDAZOLINES AND TETRAHYDROPYRIMIDINES CORRESPONDING

Robert C. Tweit, Wilmette, Ill., assignor to G. D. Searle & Co., Chicago, Ill., a corporation of Delaware No Drawing. Filed Aug. 11, 1959, Ser. No. 832,917

5 Claims. (Cl. 260—251)

The present invention relates to novel derivatives of cyclic thioureas and, more particularly, to substituted haloalkylthio-dibasic nitrogen heterocycles of the structural formula

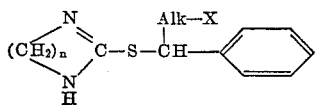

wherein Alk is a lower alkylene radical, X is a halogen having an atomic weight greater than 20, and $n$ is a positive integer greater than one and less than 4. The lower alkylene radicals represented by Alk are exemplified by:

—CH$_2$—
(methylene)

—CH$_2$CH$_2$—
(ethylene)

—CH$_2$CH$_2$CH$_2$—
(trimethylene)

$$-CH_2\overset{CH_3}{\underset{|}{C}H}-$$
(1,2-propylene)

—CH$_2$CH$_2$CH$_2$CH$_2$—
(tetramethylene)

$$-\overset{CH_3}{\underset{|}{C}H}-$$
(methylmethylene)

$$-\overset{CH_2CH_2CH_3}{\underset{|}{C}H}-$$
(propylmethylene)

$$-\overset{CH(CH_3)_2}{\underset{|}{C}H}-$$
(isopropylmethylene)

$$-\overset{CH_3}{\underset{\underset{CH_2CH_3}{|}}{C}}-$$
(methylethylmethylene)

Suitable starting materials for the manufacture of the instant compounds are aralkyl dihalides in which one of the halogen atoms is substituted on the carbon adjacent to the aromatic ring. These dihalides are reacted with the appropriate cyclic thiourea, as shown below:

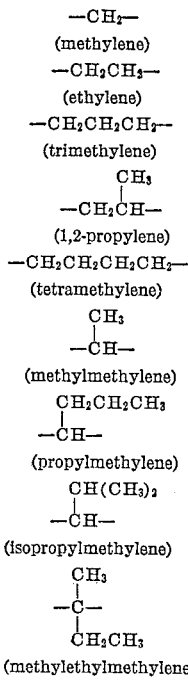

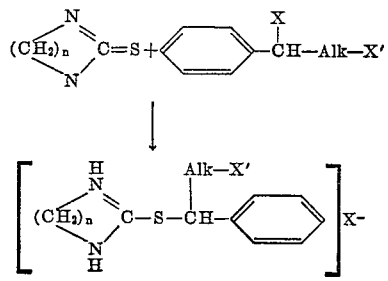

In the practice of this invention, it has been determined that selective reaction occurs at the site of the benzyl halide halogen, i.e. at the carbon adjacent to the phenyl ring, making possible facile isolation of the desired haloalkyl compounds in a high state of purity. As shown above, the instant compounds are isolated in the form of their hydrohalide salts. Other non-toxic salts which are equivalent for the purpose of this invention are, for example, the citrate, maleate, tartrate, sulfate, etc.

The process disclosed supra is preferably conducted in the presence of a suitable ionic solvent, typically a lower alkanol such as methanol, at a temperature approximating the boiling point of the solvent. After the reaction period has been completed, the product is isolated as the hydrohalide salt by precipitation from the reaction mixture. These salts are converted to the corresponding free bases by alkalization with an inorganic alkali such as sodium carbonate, extraction into a suitable organic solvent such as ether, and isolation by evaporation of the solvent.

As a specific example of the instant process, (1,2-dibromoethyl)benzene is reacted with trimethylene thiourea in methanol at the reflux temperature, to afford 2-[(2-bromo-1-phenyl)ethylthio]tetrahydropyrimidine hydrobromide. Treatment of this salt with excess sodium carbonate results in the free base, 2-[(2-bromo-1-phenyl)-ethylthio]tetrahydropyrimidine.

The compounds of this invention are useful as a result of their valuable pharmacological properties. They have the capacity, for example, to inhibit the local edema formation associated with inflammatory states.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight except where otherwise noted.

Example 1

A mixture of 13.2 parts of (1,2-dibromoethyl)-benzene, 5.8 parts of trimethylene thiourea, and 60 parts of methanol is heated on the steam bath until homogeneity is achieved, then filtered through diatomaceous earth. The filtrate is concentrated and diluted with butanone to precipitate the product, which is crystallized from methanol-butanone to afford pure 2-[(2-bromo-1-phenyl)-ethylthio]tetrahydropyrimidine hydrobromide, M.P. 167.5–169°.

The substitution of an equivalent quantity of (1-bromo-3-chloro-n-propyl)benzene in the instant process results in 2-[(3-chloro-1-phenyl)-n-propylthio]tetrahydropyrimidine hydrobromide.

Example 2

A mixture of 13.2 parts of (1,2-dibromoethyl)-benzene, 5.1 parts of ethylenethiourea, and 60 parts of methanol is heated on the steam bath until solution is complete, then filtered through diatomaceous earth and concentrated. Butanone is added, the small amount of precipitate removed by filtration, and the filtrate diluted with ether and acetone. The solid which forms is recrystallized from methanol-butanone to yield pure 2-[(2-bromo-1-phenyl)ethylthio]imidazoline hydrobromide, M.P. 159–161°.

By substituting an equivalent quantity of (1-bromo-3-chloro-n-propyl)benzene and otherwise proceeding according to the herein described processes, 2-[(3-chloro- 1-phenyl)-n-propylthio]imidazoline hydrobromide is obtained.

*Example 3*

A mixture of 5 parts of 2-[(2-bromo-1-phenyl)-ethylthio]imidazoline hydrobromide, 10 parts of sodium carbonate, 100 parts of water and 100 parts of ether is stirred for about 30 minutes. The ether solution is separated, washed with water, dried over anhydrous sodium sulfate, and concentrated to dryness to afford the oily free base, 2-[(2-bromo-1-phenyl)ethylthio]-imidazoline.

What is claimed is:

1. A member selected from the group of compounds of the structural formula

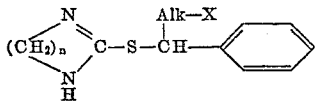

and non-toxic salts thereof; wherein Alk is a lower alkylene radical, X is a halogen having an atomic weight greater than 20, and $n$ is a positive integer greater than one and less than 4.

2. A compound of the structural formula

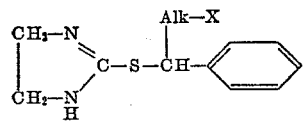

wherein Alk is a lower alkylene radical and X is a halogen having an atomic weight greater than 20.

3. A compound of the structural formula

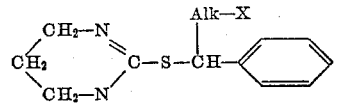

wherein Alk is a lower alkylene radical and X is a halogen having an atomic weight greater than 20.

4. 2-[(2-bromo-1-phenyl)ethylthio]imidazoline.

5. 2 - [(2 - bromo - 1 - phenyl)ethylthio]tetrahydropyrimidine.

No references cited.